(12) United States Patent  (10) Patent No.: US 8,868,502 B2
Misra et al.  (45) Date of Patent: Oct. 21, 2014

(54) ORGANIZING VERSIONING ACCORDING TO PERMISSIONS

(75) Inventors: Ronnie G. Misra, San Jose, CA (US); Eric Olaf Carlson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 13/250,807

(22) Filed: Sep. 30, 2011

(65) Prior Publication Data

US 2012/0185435 A1   Jul. 19, 2012

Related U.S. Application Data

(60) Provisional application No. 61/433,157, filed on Jan. 14, 2011.

(51) Int. Cl.
*G06F 17/30* (2006.01)
*G06F 21/62* (2013.01)

(52) U.S. Cl.
CPC ........ *G06F 21/6218* (2013.01); *G06F 17/3023* (2013.01)
USPC .......................................... 707/638; 707/634

(58) Field of Classification Search
CPC .................................................. G06F 17/3023
USPC .................................. 707/638, 999.203, 634
See application file for complete search history.

(56) References Cited

U.S. PATENT DOCUMENTS

| | | | |
|---|---|---|---|
| 5,317,729 A * | 5/1994 | Mukherjee et al. | 1/1 |
| 5,819,295 A * | 10/1998 | Nakagawa et al. | 1/1 |
| 6,609,215 B1 * | 8/2003 | Hamilton et al. | 714/15 |
| 6,684,224 B2 | 1/2004 | Meding et al. | |
| 6,885,748 B1 * | 4/2005 | Wang | 380/201 |
| 7,149,959 B1 * | 12/2006 | Jones et al. | 715/234 |
| 7,234,077 B2 * | 6/2007 | Curran et al. | 714/15 |
| 7,707,455 B2 * | 4/2010 | Anand et al. | 714/6.12 |
| 7,765,195 B2 * | 7/2010 | Miller et al. | 707/695 |
| 8,032,491 B1 * | 10/2011 | Appellof et al. | 707/649 |
| 8,166,003 B2 * | 4/2012 | Friesenhahn et al. | 707/695 |
| 8,276,121 B2 * | 9/2012 | Miller et al. | 717/122 |
| 8,296,320 B1 * | 10/2012 | Corbett et al. | 707/781 |
| 2002/0019827 A1 * | 2/2002 | Shiman et al. | 707/200 |
| 2002/0059328 A1 * | 5/2002 | Watkins | 707/203 |
| 2002/0107877 A1 * | 8/2002 | Whiting et al. | 707/204 |
| 2002/0143735 A1 * | 10/2002 | Ayi et al. | 707/1 |
| 2004/0186845 A1 * | 9/2004 | Fukui | 707/100 |
| 2008/0306954 A1 * | 12/2008 | Hornqvist | 707/9 |
| 2009/0030948 A9 * | 1/2009 | Lipman et al. | 707/200 |
| 2009/0043774 A1 * | 2/2009 | Sudhakar | 707/9 |
| 2010/0023520 A1 * | 1/2010 | Barboy et al. | 707/8 |
| 2010/0043015 A1 | 2/2010 | McClements et al. | |
| 2010/0077173 A1 | 3/2010 | Rao et al. | |
| 2010/0082553 A1 * | 4/2010 | Beatty et al. | 707/679 |
| 2010/0106709 A1 * | 4/2010 | Imai et al. | 707/713 |
| 2010/0269164 A1 * | 10/2010 | Sosnosky et al. | 726/7 |

\* cited by examiner

*Primary Examiner* — Miranda Le
(74) *Attorney, Agent, or Firm* — Fish & Richardson P.C.

(57) ABSTRACT

Methods, systems, and apparatus, including computer programs encoded on a computer storage medium, for storing data according to permissions. In general, one aspect of the subject matter described in this specification can be embodied in methods that include the actions of identifying a version of a data item to be stored; determining permissions associated with the version of the data item; and storing the version of the data item at a storage location that is based on the determined permissions.

15 Claims, 5 Drawing Sheets

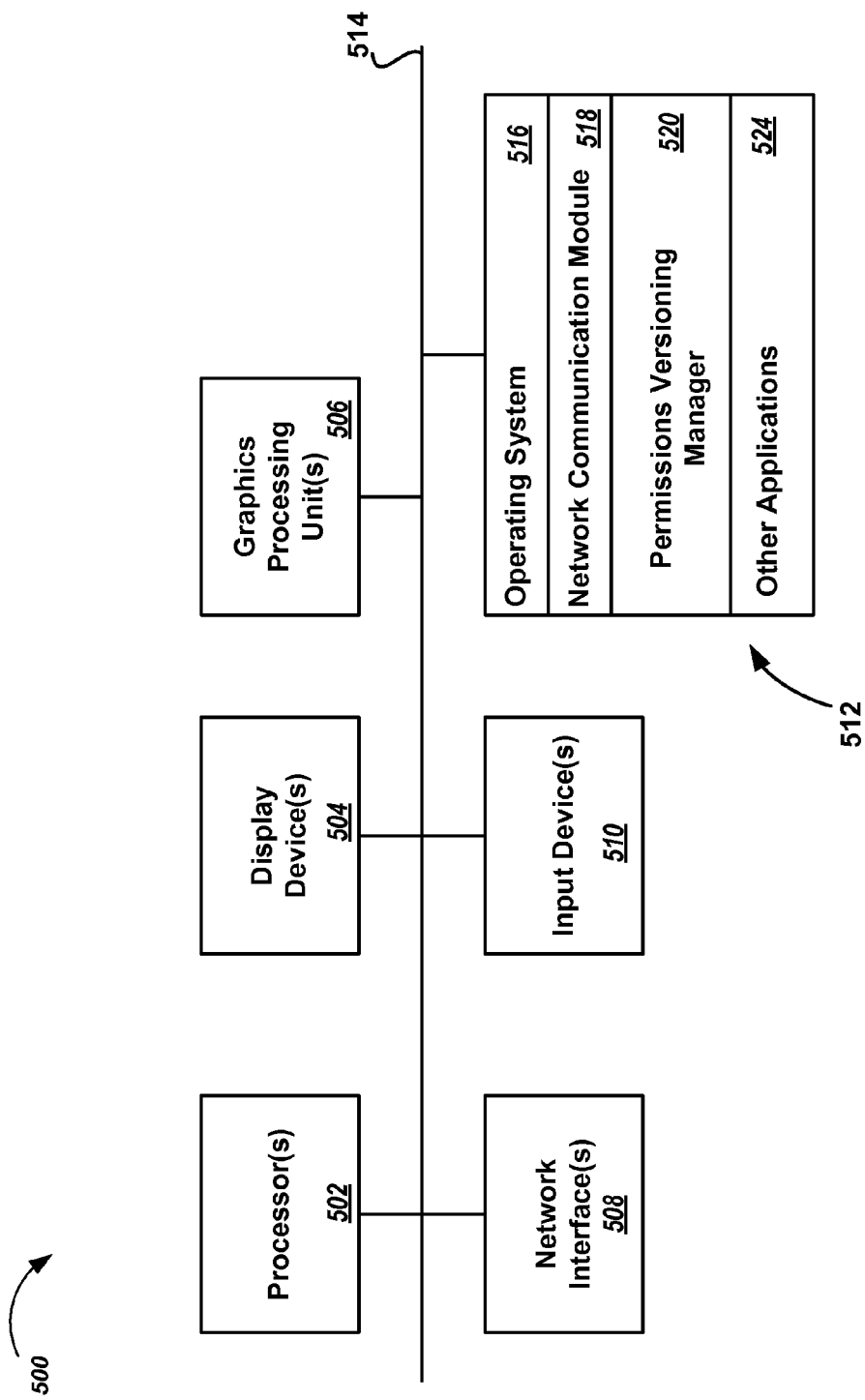

ORGANIZING VERSIONING ACCORDING TO PERMISSIONS

CROSS-REFERENCE TO RELATED APPLICATIONS

This application claims the benefit under 35 U.S.C. §119(e) of the filing date of U.S. Patent Application No. 61/433,157, for Organizing Versioning According to Permissions, which was filed on Jan. 14, 2011, and which is incorporated here by reference.

BACKGROUND

This specification relates to storing data.

Typical systems allow for the storage of multiple versions of a data item (e.g., versions of a file stored in a backup). In some conventional systems, these versions are stored according to the location of the data item in a hierarchical file system, for example, within the file system hierarchy of a local device or in a backup that mimics the file system hierarchy. Thus, storing a version typically requires storing the entire file system directory path. Conventionally, all versions of the data item have the same permissions as the permissions of the current data item.

SUMMARY

This specification describes technologies relating to storing data according to permissions.

In general, one aspect of the subject matter described in this specification can be embodied in methods that include the actions of identifying a version of a data item to be stored; determining permissions associated with the version of the data item; and storing the version of the data item at a storage location that is based on the determined permissions. Other embodiments of this aspect include corresponding systems, apparatus, and computer programs recorded on computer storage devices, each configured to perform the operations of the methods.

These and other embodiments can each optionally include one or more of the following features. Storing the version of the data item comprises storing the version of the data item within a node of a permissions tree corresponding to the determined permissions. Storing the version further comprises: determining whether there is an existing branch of the permissions tree associated with the determined permission; and if not, generating a new branch of the permissions tree associated with the determined permission. The permissions tree includes one or more nodes, each node associated with specific permissions. The version is stored without regard to the location of the data item with respect to a file system hierarchy. Access to the version of the data item by a user is controlled by the permissions associated with the storage location in which the version of the data item is stored. The version of the data item has a different permissions than a second version of the data item, wherein the second version of the data item is stored at a second storage location that is based on the permissions of the second version of the data item.

In general, one aspect of the subject matter described in this specification can be embodied in methods that include the actions of receiving a request from a user for one or more versions of a data item; identifying the one or more versions of the data item; determining the permissions associated with each version of the one or more versions of the data item; and providing access only to those versions of the one or more versions of the data item to which the user has permission. Other embodiments of this aspect include corresponding systems, apparatus, and computer programs recorded on computer storage devices, each configured to perform the operations of the methods.

These and other embodiments can each optionally include one or more of the following features. determining the permissions includes searching a database for the one or more versions of the data item, the database including an ordering of versions for each of a plurality of data items and a location within a permissions tree of each version. The location of each version of the data item is based on the assigned permissions for each respective version of the data item. All identified versions of the one or more versions of the data item are presented, but only those to which the user has permissions are accessible. Only those versions of the one or more versions of the data item to which the user has permission are presented.

Particular embodiments of the subject matter described in this specification can be implemented so as to realize one or more of the following advantages. A permissions based versioning system allows versions of data items to be stored more compactly in a permissions tree. Thus, there is no need to store an entire file hierarchy associated with the stored versions of the data items. The permissions tree only adds additional nodes when new permissions are generated. Permissions for particular versions can remain fixed over time so that access to versions can be different based on the permissions at the time respective versions are generated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates an example architecture of a system.

Like reference numbers and designations in the various drawings indicate like elements.

DETAILED DESCRIPTION

A system can store one or more versions of a data item (e.g., a file) for later retrieval. A data item can be a file (e.g., a document, media file (movie, image, audio)) or other data. Versions of data items are stored according to their permissions at the time of storage. As a result, the original location within the file system is not used. Instead, versions of data items are stored and indexed according to the permissions assigned to that version of the data item at the time of storage. Each version of the data item is stored according to the permissions of that version without changing previously stored versions.

For example, if a first version has permissions allowing User A to read the file, the first version is stored according to the permission "User A Read". If a second version has different permissions, e.g., User B allowed to read and User A no longer having permissions, the second version is stored according to the permission "User B Read". User A will not have access to the second version since User A does not have permission for that version of the data item. However, User A will retain access to the first version. In some implementations, when a user requests one or more versions of a data item, the permissions associated with that data item are identified and only those data items to which the user has permissions are presented.

A useful analogy is to a set of permissions buckets where each bucket has particular permissions (e.g., User A Read). Versions of data items are placed in the corresponding buckets that have matching permissions. A new bucket is generated if the permissions of the version to be stored do not have a corresponding bucket. In some implementations, once a version of a data item is placed in a bucket, it is never removed, thus the permissions are fixed for the version of the data item after being placed in a particular bucket.

Figure 1:
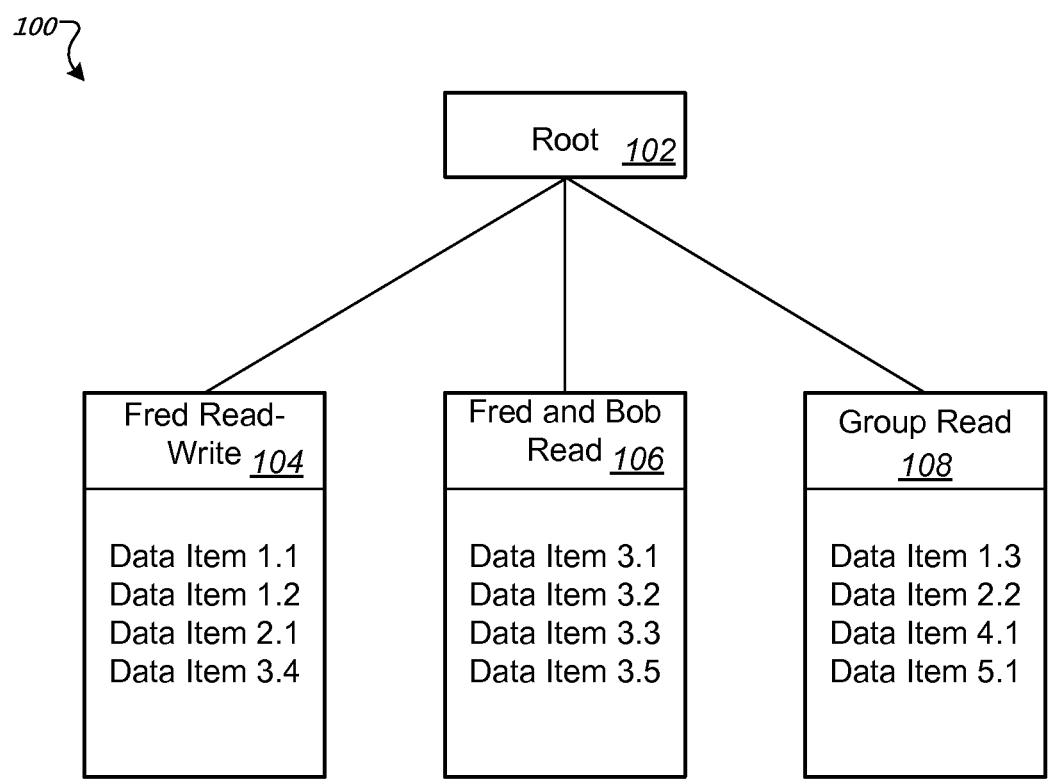
FIG. 1 is an example representation of a permissions based data store.

FIG. 1 is an example representation of a permissions based data store 100. In particular, the permissions based data store 100 illustrates that the versions of data items are not stored according to their file system location, but instead according to their respective permissions. A permissions tree is generated in which each node is associated with particular permissions. Different types of permissions are possible including read access, write access, and read-write access. Other types of permissions can be assigned, for example, an execute permission that grants the ability to execute a file (e.g., a script or other executable file type). Permissions can be assigned to specific users (or user accounts) or groups of users. Additionally, a data item can be associated with more than one type of permission and the permissions can be assigned to more than one distinct user. In some implementations, permissions are subtractive such that full permissions are granted to all data items until limited by more restrictive permissions.

Specifically, permissions based data store 100 shows a root node 102 and three permissions nodes 104, 106, and 108 branching from root node 102. Node 104 is associated with the permission "Fred Read-Write". Node 106 is associated with the permission "Fred and Bob Read". Node 108 is associated with the permission "Group Read" where a Group could be all users or some specified group of users.

Versions of data items are stored according to the assigned permissions. Thus, for example, Data Item 1.1 refers to version 1 of data item 1. As shown in FIG. 1, Data Item 1 includes versions 1 and 2 as having permission "Fred Read-Write". However, Data Item 1.3 (version three of data item 1) has permissions "Group Read". Thus, while Fred alone has access to versions 1 and 2, version 3 is accessible by all users of the group. As another example, Fred alone has access to version 4 of data item 3 (Data Item 3.4) while Fred and Bob have read access to versions 1, 2, 3, and 5 of data item 3. Thus, Bob cannot access version 4 of data item 3, but can access the other versions. While the versions of the data items are shown for clarity as ordered (e.g. by version number or by data item), the versions of the data items may or may not be stored in an ordered form.

Figure 2:
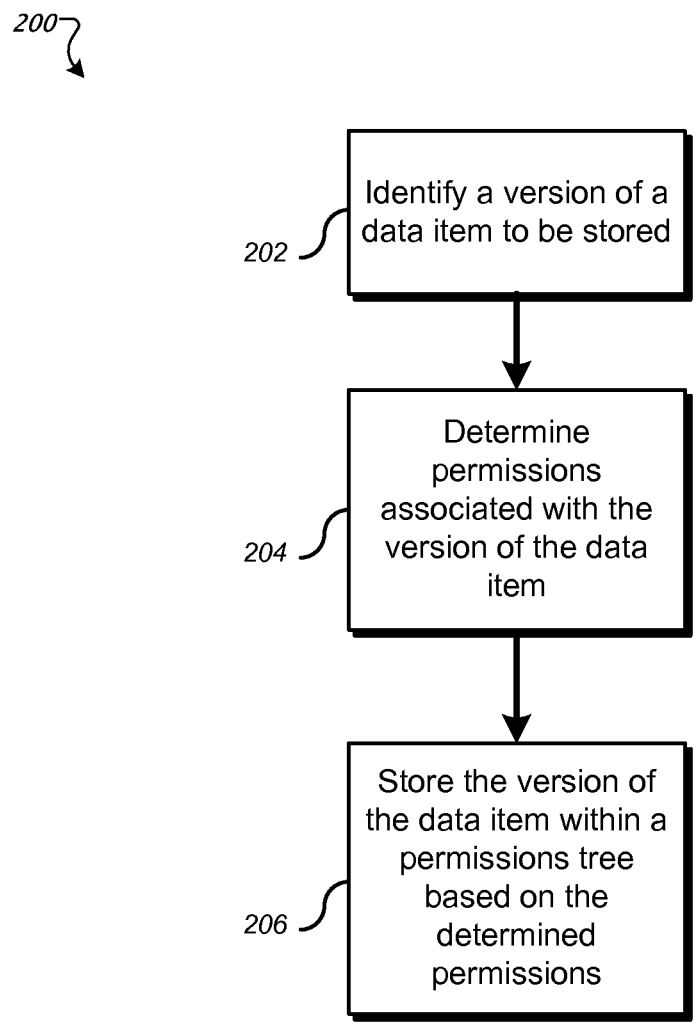
FIG. 2 is a flow diagram of an example process for storing a data item version according to permissions.

FIG. 2 is a flow diagram of an example process 200 for storing a data item version according to permissions assigned to that data item. The process 200 can be performed, for example, by one or more computing devices (e.g., a computer, mobile device, tablet device, personal data assistant, server, or other device).

A version of a data item to be stored is identified (step 202). A version of a data item can be identified in a number of ways. For example, a version can be generated based on a user editing of the data item. In another example, saving a modified data item can result in a new version being stored. In some implementations, versions are generated and stored prior to writing new modifications or saving a new current data item. For example, a current data item can be modified. The unmodified version is stored as a past version while the modification is applied to the current data item. For example, in some implementations, modifications to a data item are intercepted prior to execution and a version is generated prior to the modification taking place.

In some implementations, the current data item is a version that is also stored with the earlier versions of the data item (if any). The current data items and earlier versions may or may not be stored in an ordered form. In some other implementations, the current data item resides only in the file system hierarchy and is not stored with the prior versions (e.g., in the permissions based data store).

A determination is made of the permissions associated with the version of the data item to be stored (step 204). In some implementations, the data item is inspected to determine all assigned permissions. The permissions can include different permissions types for one or more users. Thus, the type of permissions for each assigned user is determined. Permissions can be stored as part of the data item, attributes of the data item, or as part of an access control list for the data item or for a group of data items.

The version of the data item is stored within a permissions tree based on the determined permissions (step 206). For example, the version of the data item can be associated with a particular node of a permission tree. If the particular permissions of the data item already exist in the permissions tree, then the data item version is stored in a location associated with the corresponding permissions. Additionally, in some implementations, permissions are subtractive such that unless specified otherwise all users have permission. Thus, a compact permissions tree can be formed in which a full group node allows full access to all users. All versions can be stored with this node unless otherwise specified with more limiting permissions (e.g., permissions to a single user).

A new node in the permissions tree can be generated when the determined permissions do not appear already in the permissions tree. For example, if a version of the data item to be stored has permissions "Fred Read" this means only user Fred can read the data item. If the permissions tree only has a node for "full group access" a new node in the permissions tree is generated for "Fred Read". The version of the data item is then added to the newly generated branch of the permissions tree.

In some implementations, adding a new version to the permissions tree also includes updating a versions database that includes an ordered list of versions for each data item and a respective location in the permissions tree.

Figure 3:
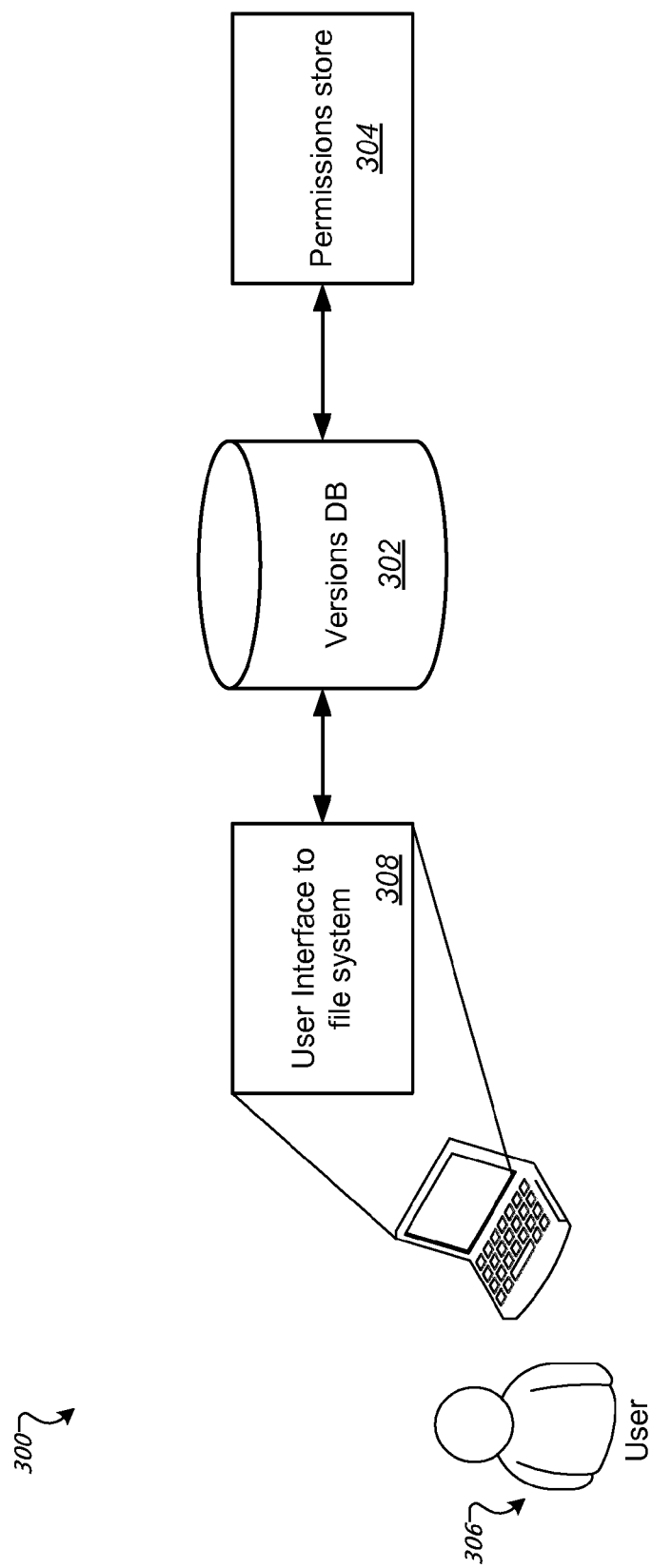
FIG. 3 is a block diagram of an example permissions based versioning system.

FIG. 3 is a block diagram of an example permissions based versioning system 300. The permissions based versioning system includes a versions database 302 and a permissions store 304. Particular versions can be requested by and/or presented to a user 306 through a particular user interface 308. For example, a user interface 308 can be a user interface to the file system (e.g., a search utility or application, backup application, or specific versioning interface).

The permissions store 304 includes the versions stored according to assigned permissions in the permissions tree. The versions database 302 can include an ordering of versions of each data item and their respective locations within the permissions store 304 (e.g., a particular permissions node in the permissions tree). Alternatively, in some implementations, the versions database 302 includes the version of each data item in a different or unordered form that maintains an identification of their respective locations within the permissions store 304. Thus, when a request for versions of a particular data item is received, the versions database 302 can be searched to identify all versions of that data item and their respective locations in the permissions store 304. Additionally, since the permissions store is organized by permissions, the locations in the database also identify the permissions of each version.

In some implementations, the versions database 302 includes metadata associated within each version. The metadata for a particular version can include information on how the particular version was generated, user explanatory text, contextual information, conflict resolution information, and other annotations.

Figure 4:
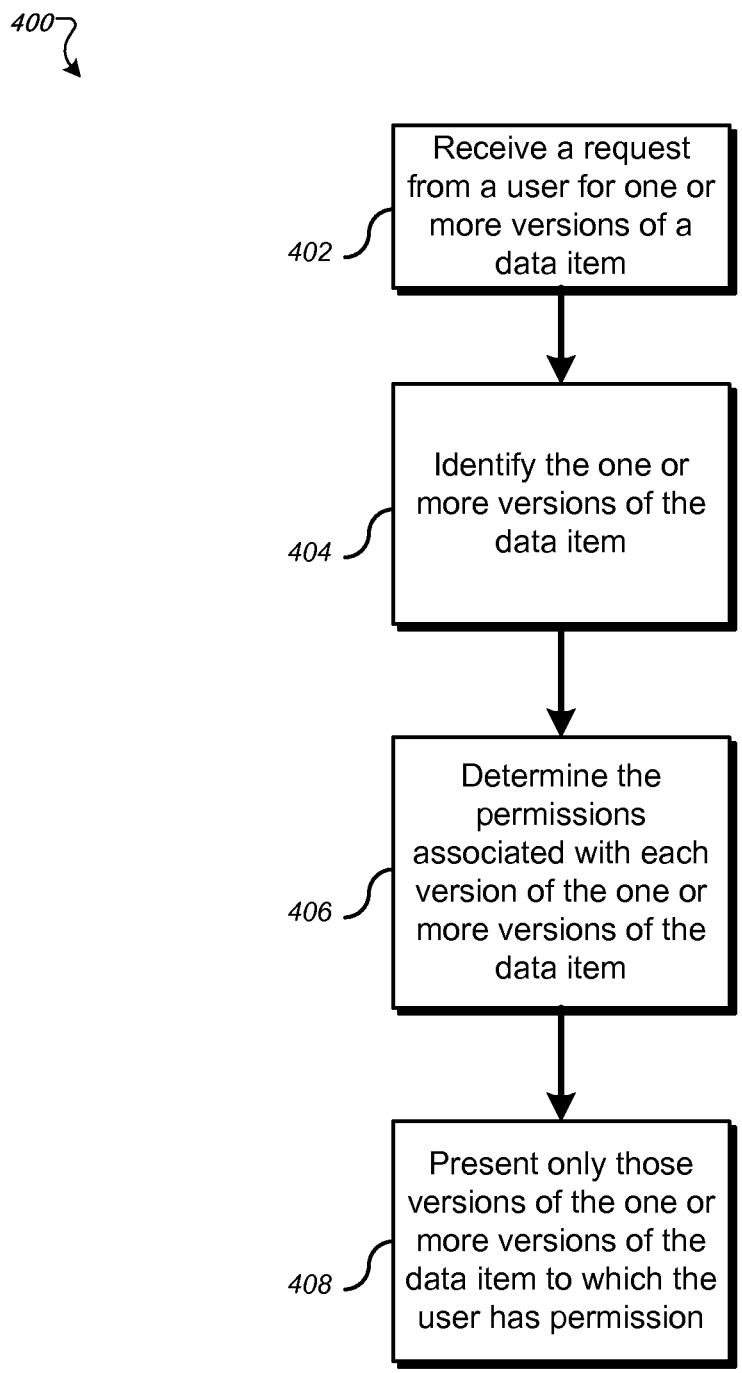
FIG. 4 is a flow diagram of an example process for retrieving a data item.

FIG. 4 is a flow diagram of an example process 400 for retrieving a data item. The process 400 can be performed, for example, by one or more computing devices as described above with respect to FIG. 3.

A request is received from a user for one or more versions of a data item (step 402). The request can be received, for example, as part of a search performed in a user interface to the file system. For example, a user working in the current data item can request prior versions of that data item in order to identify particular changes or recover particular content found in an earlier version. In some implementations, the user can input search parameters into a search interface to include one or more versions of data items in the search rather than just the current data items in the file system.

One or more versions of the data item are identified (step 404). In some implementations, a database of versions is searched to identify stored versions of the data item. The versions can be indexed in the database by data item in order to identify all versions of the data item. In some implementations, an identifier for the data item is used to identify versions of the data item within the database. For example, each data item can have a unique identifier. Additionally, each version stored can be associated with that unique identifier. Thus, the unique identifier can be used to identify each version of the data item.

The permissions associated with each version of the one or more versions of the data item are determined (step 406). Different versions of the same data item can have different permissions. In some implementations, determining permissions for a version includes examining the permissions associated with parent or ancestor items in a hierarchical file system. Each version has an identified location in a permissions store where the version of the data item is stored. Thus, the location also identifies the permissions for each respective version. Different versions of data items can be associated with different permissions.

For example, a first user can grant permission to a second user to read and write to forward versions of the data item. Thus, if versions 1-5 of the data item already exist at the time the second user was granted permission, the second user would still not have access to versions 1-5. However, the second user would have access to versions 6 and on. If after the tenth version, the first user rescinds the permission of the second user, the second user would still maintain access to versions 6-10, but would no longer have access for later versions (versions 11 and on). This is because the versions are stored in the versions store according to permissions and they are not moved when permissions change for later versions. The associated permissions can be shown, for example, as:
Data item versions 1-5: No permissions to the second user.
Data item versions 6-10: Read and Write permission for second user.
Data item versions 11 and on: No permissions to the second user.

However, in some other implementations, versions can be moved as permissions change so that all versions of a data item maintain consistent permissions.

Those versions of the one or more versions of the data item to which the user has permission are presented (step 408). For example, the versions can be presented in a list or other visual representation of versions. In some implementations, a list of versions is generated with associated links (e.g., uniform resource locator links) to the corresponding versions of the data item. Alternatively, the versions can be presented as items identifying a path to the location of the respective versions in the permissions tree. The list can include all versions or can include only those versions to which the requesting user has permission. For example, when presenting a list of all of the versions, the links to those in which the user does not have access will not be active. For those that the user does have permission, the user can select the version from the list using the link, which causes the selected version of the data item to be accessed (e.g., a file can be opened by the associated application).

In some implementations, the permissions of the current data item is identified. If the requesting user does not have permission to the current version of the data item, than no versions of the data item are presented to the user. Thus, access to any versions of a data item can be predicated on access to the current data item.

FIG. 5 illustrates an example architecture of a system 500. The system architecture 500 is capable of performing operations for storing versions of data items based on permissions. The architecture 500 includes one or more processors 502 (e.g., IBM PowerPC, Intel Pentium 4, etc.), one or more display devices 804 (e.g., CRT, LCD), graphics processing units 506 (e.g., NVIDIA GeForce, etc.), a network interface 508 (e.g., Ethernet, FireWire, USB, etc.), input devices 510 (e.g., keyboard, mouse, etc.), and one or more computer-readable mediums 512. These components exchange communications and data using one or more buses 514 (e.g., EISA, PCI, PCI Express, etc.).

The term "computer-readable medium" refers to any medium that participates in providing instructions to a processor 502 for execution. The computer-readable medium 512 further includes an operating system 516 (e.g., Mac OS®, Windows®, Linux, etc.), a network communication module 518, a permissions versioning manager 520, and other applications 524.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, etc.); and managing traffic on the one or more buses 514. The network communications module 518 includes various components for establishing and maintaining network connections (e.g., software for implementing communication protocols, such as TCP/IP, HTTP, Ethernet, etc.).

The permissions versioning manager 520 provides various software components for performing the various functions for storing versions of data items based on permissions, as described with respect to FIGS. 1-4.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
identifying a first version of a data item to be stored, the first version of a data item having been generated based on modifications to a second version of the data item;
determining a first set of permissions associated with the first version of the data item;
identifying, in a permissions tree that includes one or more nodes each associated with specific permissions, a first node based on a similarity between the first set of permissions and permissions associated with the first node, the first node being associated with permissions matching the first set of permissions associated with the first version of the data item;
wherein identifying the first node comprises:
determining whether an existing node of the permissions tree is associated with permissions matching the first set of permissions;
if so, identifying that existing node as the first node;
if not, generating a new node of the permissions tree associated with the first set of permissions, and identifying the new node as the first node; and
storing the first version of the data item at the identified first node of the permissions tree,
wherein the permissions tree stores a second version of the data item at a second node, the second node being associated with a second set of permissions not matching the first set of permissions, and
wherein permissions of the data item changed between a time at which the second version of the data item was stored in the permissions tree and a time at which the first version of the data item is stored in the permissions tree.

2. The method of claim 1, wherein the first version is stored without regard to the location of the data item with respect to a file system hierarchy.

3. The method of claim 1, wherein access to the first version of the data item by a user is controlled by the permissions associated with the storage location in which the first version of the data item is stored.

4. The method of claim 1, wherein the first data item is stored in a file system hierarchy separate from the permissions tree storing the version of the first data item.

5. The method of claim 1, wherein storing the first version in the permissions tree comprises updating a versions database that includes an ordered list of versions of the data item and a respective location of each version of the data item in the permissions tree.

6. A system comprising:
one or more computing devices operable to perform operations comprising:
identifying a first version of a data item to be stored, the first version of a data item having been generated based on modifications to a second version of the data item;
determining a first set of permissions associated with the first version of the data item;
identifying, in a permissions tree that includes one or more nodes each associated with specific permissions, a first node based on a similarity between the first set of permissions and permissions associated with the first node, the first node being associated with permissions matching the first set of permissions associated with the first version of the data item,
wherein identifying the first node comprises:
determining whether an existing node of the permissions tree is associated with permissions matching the first set of permissions;
if so, identifying that existing node as the first node;
if not, generating a new node of the permissions tree associated with the first set of permissions, and identifying the new node as the first node; and
storing the first version of the data item at the identified first node of the permissions tree, wherein the permissions tree stores a second version of the data item at a second node, the second node being associated with a second set of permissions not matching the first set of permissions, and
wherein permissions of the data item changed between a time at which the second version of the data item was stored in the permissions tree and a time at which the first version of the data item is stored in the permissions tree.

7. The system of claim 6, wherein the first version is stored without regard to the location of the data item with respect to a file system hierarchy.

8. The system of claim 6, wherein access to the first version of the data item by a user is controlled by the permissions associated with the storage location in which the first version of the data item is stored.

9. The system of claim 6, wherein the first data item is stored in a file system hierarchy separate from the permissions tree storing the first version of the data item.

10. The system of claim 6, wherein storing the first version in the permissions tree comprises updating a versions database that includes an ordered list of versions of the data item and a respective location of each version of the data item in the permissions tree.

11. A computer storage medium encoded with a computer program, the program comprising instructions that when executed by data processing apparatus cause the data processing apparatus to perform operations comprising:

identifying a first version of a data item to be stored, the first version of a data item having been generated based on modifications to a second version of the data item;

determining a first set of permissions associated with the first version of the data item;

identifying, in a permissions tree that includes one or more nodes each associated with specific permissions, a first node based on a similarity between the first set of permissions and permissions associated with the first node, the first node being associated with permissions matching the first set of permissions associated with the first version of the data item;

wherein identifying the first node comprises:

determining whether an existing node of the permissions tree is associated with permissions matching the first set of permissions;

if so, identifying that existing node as the first node;

if not, generating a new node of the permissions tree associated with the first set of permissions, and identifying the new node as the first node; and storing the first version of the data item at the identified first node of the permissions tree, wherein the permissions tree stores a second version of the data item at a second node, the second node being associated with a second set of permissions not matching the first set of permissions, and wherein permissions of the data item changed between a time at which the second version of the data item was stored in the permissions tree and a time at which the first version of the data item is stored in the permissions tree.

12. The computer storage medium of claim 11, wherein the first version is stored without regard to the location of the data item with respect to a file system hierarchy.

13. The computer storage medium of claim 11, wherein access to the first version of the data item by a user is controlled by the permissions associated with the storage location in which the first version of the data item is stored.

14. The computer storage medium of claim 11, wherein the data item is stored in a file system hierarchy separate from the permissions tree storing the first version of the data item.

15. The computer storage medium of claim 11, wherein storing the first version in the permissions tree comprises updating a versions database that includes an ordered list of versions of the data item and a respective location of each version of the data item in the permissions tree.

* * * * *